Patented Sept. 28, 1937

2,094,453

UNITED STATES PATENT OFFICE 2,094,453

ESTERS OF KETO ACIDS

Alphons O. Jaeger, Mount Lebanon, Pa., assignor, by mesne assignments to American Cyanamid & Chemical Corporation, a corporation of Delaware No Drawing. Original application July 17, 1930, Serial No. 468,726. Divided and this application September 11, 1931, Serial No. 562,418

1 Claim. (Cl. 260—64)

This invention relates to esters of keto acids, and to methods of preparation and purification of such esters.

Objects of the invention are to provide a new series of chemical compounds having valuable solvent and plasticizing properties and new and commercially practicable methods of preparing and purifying such compounds.

According to the invention esters of keto acids containing at least one cyclic nucleus are prepared, in which the esterifying radical is cyclic and contains more than two carbon atoms. Such acids always contain at least two radicals or groups connected by a keto or CO group, and one of these groups includes the carboxylic acid radical to which the ester-forming alkyl radical is to be attached. In the esters of the present invention the radical or group which is attached to the keto group but which is not directly connected with the alkyl radical is either unsubstituted by halogen or contains another substituent in addition to a single halogen. In other words, monohalogen substitution products in which the halogen is combined with the non-ester forming group attached to the keto or CO radical are excluded from the present invention.

The composition of the new compounds of the present invention can be expressed by the following structural formula:

in which at least one of the groups R and R' contain or consist of a cyclic nucleus and in which R may be any substituted or unsubstituted heterocyclic or hydroaromatic group, or any aromatic group that is unsubstituted by halogen or that contains another substituent in addition to a single halogen, or any carbocyclic group having more or less than six members. R' may be any organic group, either acyclic or cyclic, and may be substituted or unsubstituted.

In the above formula, which of course represents a pure chemical compound, X may be any cyclic alcohol radical having more than two carbon atoms. In the commercial production of these products it is not always necessary or even desirable to produce unmixed esters of a single alcohol, but on the contrary many mixed esters can advantageously be prepared; for example, the mixtures of amyl alcohols obtained from the chlorination and saponification of natural gas fractions and sold under the trade name "Pentasol" can be combined with keto-aromatic acids to produce very desirable products. Similarly, mixtures of alcohols having differing numbers of carbon atoms can be used in the esterification process, the resulting product retaining all the advantages of the keto group and at the same time having a wider range of properties resulting from the proper choice of mixtures of alcohols for any given purpose.

It will be apparent that cyclic alcohols of any type may be chosen for the esterification, either the monohydric alcohols, the various polyhydric alcohols or any desired mixtures of any of these, and the alcohols having less than two carbon atoms, the esters of which form per se no part of the present invention, may also of course be mixed with other alcohols to endow the final product with properties that may be desirable in many cases. It is to be noted, however, that many mixed or unmixed esters of polyhydric alcohols which are themselves resinophoric do not form a part of the present invention, for example the mixed glycerol esters of phthalic and benzoylbenzoic acids and the ester resulting from the coupling of one part of glycerol with three parts of benzoylbenzoic acid.

Keto acids used in forming the esters of the present invention may be prepared by various means, the most common being by the Friedel-Crafts reaction by using dibasic acids. The most common acids or their anhydrides are phthalic anhydride and its substitution products, naphthalic anhydride and its substitution products, maleic acid, succinic acid, adipic acid, and the like. The compounds caused to react with the dibasic acids to form the keto acids include any of the heterocyclic or hydroaromatic groups or aromatic groups other than those containing only a single halogen substituent. Among the common reagents are benzene, toluene and higher homologues and their substitution products (other than mono-halogen substitution products), naphthalene and its homologues and substitution products, acenaphthene, acenaphthylene, phenanthrene, anthracene, fluorene, etc. Among the hydroaromatics may be included cyclohexanes, hydrogenated naphthalenes, phenanthrenes, anthracenes, acenaphthenes and fluorenes. The above enumerated keto acids are in no sense intended to limit the scope of the invention, but merely cover a few commercially more important acids.

The esters of the present invention are particularly useful as solvents and as plasticizers. Since they are for the most part stable liquids with very high boiling points they can be used wherever a solvent or plasticizer having these properties is needed, and in addition the presence of the keto group endows the esters of the present invention with the properties of ketonic compounds and makes them particularly suitable as solvents and as plasticizers for difficultly plasticizable materials such as nitrocellulose, cellulose acetate, other cellulose esters and ethers and the like. The fact that the esters of alcohols having more than three carbon atoms are practically all liquids at ordinary temperatures is quite surprising in view of the fact that many of the corresponding esters of alcohols containing one or two carbon atoms are solids, and is probably due to the increasing influence of the alkyl radical. This property is, however, of great advantage in the commercial use of these substances and is one of the advantages of the present invention.

The new products can in general be prepared by the ordinary methods. The keto acid is refluxed for from 16 to 48 hours with an excess of the alcohol in the presence of sulfuric or hydrochloric acid, after which the product is neutralized with sodium carbonate and the excess alcohol distilled off. The residue is dissolved in benzene or other suitable solvent and the unchanged keto acid and mineral acids extracted by washing with dilute sodium carbonate solution, after which the solvent is distilled off.

For many of the esterifications it is desirable to use the azeotropic method where water is removed in the form of an azeotropic mixture with organic compounds. For example, benzene may be added and the temperature maintained at a point at which the water formed is continuously removed as an azeotropic mixture with benzene. The azeotropic method may also be combined with the use of other dehydrating agents such as sulfuric acid, hydrochloric acid, etc. A third way of producing the esters is to act on the salt of the acid with the halogen ester of the alcohol. Some of the esters are more advantageously produced by one method and some by others.

The esters formed are nearly always contaminated by impurities, which are yellowish in color, but further purification by distillation usually effects a marked lightening in color. Because of the extremely high boiling point of the esters it is usually desirable to effect such distillation under reduced pressure, both because of the saving in fuel thus effected and because light-colored products which are free from decomposition products are more readily obtained in this manner.

The preparation and properties of representative esters illustrative of the invention will be described in more detail in the following examples, but the invention is not limited thereto.

In the examples the trade name "Novite" refers to a commercial grade of adsorbent carbon principally from peach kernels, but it is understood that any similar commercial grade of activated carbon may be used with equally good results.

Example 1

30 parts by weight of benzoylbenzoic acid are dissolved in 150 parts of water containing 7.1 parts of $Na_2CO_3$. 17 parts by benzyl chloride are added and the mixture is refluxed for 15 hours.

At the end of the period of refluxing the liquid will be found to have separated into an upper oily layer and a lower watery solution. The oily layer is separated, dissolved in 74 parts of ether and shaken twice with 100 parts of 15% $Na_2CO_3$. The purified oily layer is then drawn off and agitated with "Novite" or similar activated charcoal or other purifying substance, after which the liquid is filtered off and the ether evaporated. The residue is distilled under a vacuum, a fraction coming over at 190 to 240° C. which is rejected, after which the main part distills over above 300° C. If necessary this latter fraction is further decolorized by diluting with ether, again agitating with "Novite", filtering and evaporating off the ether. The product, which is the benzyl ester of benzoylbenzoic acid is obtained as yellow syrup having a boiling point of approximately 365° C.

Example 2

100 parts of benzoylbenzoic acid and 500 parts of cyclohexanol, together with 12 parts of concentrated hydrochloric acid are refluxed for 18 hours after which the product is well washed with water and heated to 100° C. with "Novite" or other adsorbent charcoal or other purifying medium. The suspension is cooled to 30° C., filtered, and the excess cyclohexanol distilled off with steam.

The ester is separated from the water mixture by extraction with chloroform, neutralized with sodium carbonate if necessary, and boiled with "Novite" until the suspension is sufficiently decolorized. The cooled suspension is filtered and the chloroform evaporated off, the cyclohexanyl ester being obtained as a yellow syrupy liquid having a boiling point of approximately 310° C. under atmospheric pressure.

This a division of my co-pending application, Serial No. 468,726, filed July 17, 1930.

What is claimed as new is:

As a new chemical compound, cyclohexanyl naphthoylbenzoate having the following formula

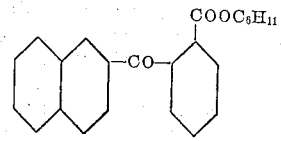

ALPHONS O. JAEGER.